(12) United States Patent
Zhou et al.

(10) Patent No.: US 9,264,737 B2
(45) Date of Patent: Feb. 16, 2016

(54) ERROR RESILIENT TRANSMISSION OF RANDOM ACCESS FRAMES AND GLOBAL CODING PARAMETERS

(71) Applicant: Apple Inc., Cupertino, CA (US)

(72) Inventors: Xiaosong Zhou, Campbell, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 579 days.

(21) Appl. No.: 13/632,913

(22) Filed: Oct. 1, 2012

(65) Prior Publication Data

US 2014/0092997 A1  Apr. 3, 2014

(51) Int. Cl.
   H04N 19/65    (2014.01)
   H04N 19/67    (2014.01)
   H04N 19/44    (2014.01)
   H04N 19/895   (2014.01)

(52) U.S. Cl.
   CPC ............ *H04N 19/65* (2014.11); *H04N 19/44* (2014.11); *H04N 19/67* (2014.11); *H04N 19/895* (2014.11)

(58) Field of Classification Search
   CPC ....... H04N 19/65; H04N 19/67; H04N 19/89; H04N 19/166
   USPC ........................ 375/240.27, 240.28, E7.055
   See application file for complete search history.

(56) References Cited

U.S. PATENT DOCUMENTS

| 4,827,339 A | 5/1989 | Wada et al. |
| 5,703,889 A | 12/1997 | Shimoda et al. |
| 5,739,860 A | 4/1998 | Hoshino et al. |
| 6,049,570 A | 4/2000 | Fukunaga et al. |
| 6,357,028 B1 | 3/2002 | Zhu |
| 6,836,514 B2 | 12/2004 | Gandhi et al. |
| 8,265,145 B1 | 9/2012 | Pejhan et al. |
| 8,374,240 B1 | 2/2013 | Namboodiri et al. |
| 2004/0080669 A1 | 4/2004 | Nagai et al. |
| 2005/0031030 A1 | 2/2005 | Kadono et al. |
| 2006/0098738 A1 | 5/2006 | Cosman et al. |
| 2006/0188025 A1 | 8/2006 | Hannuksela |

(Continued)

FOREIGN PATENT DOCUMENTS

WO   99/56472 A1   11/1999

OTHER PUBLICATIONS

Zhang et al., "Cross-Layer Frame Discarding for Cellular Video Coding", IEEE International Conference on Acoustics, Speech and Signal Processing, Apr. 15-20, 2007, ICASSP 2007, vol. 2.

(Continued)

*Primary Examiner* — Sath V Perungavoor
*Assistant Examiner* — Clifford Hilaire
(74) *Attorney, Agent, or Firm* — Kenyon & Kenyon LLP (57) ABSTRACT

Error mitigation techniques are provided for video coding system in which input frames are selected for coding either as a Random Access Pictures ("RAP frames") or as a non-RAP frame. Coded RAP frames may include RAP identifiers that set an ID context for subsequent frames. Coded non-RAP frames may include RAP identifiers that match the RAP identifiers that were included in the coded RAP frames. Thus, in the absence of transmission errors, a coded non-RAP frame should include a RAP identifier that matches the identifier of the preceding RAP frame. If the identifier of a non-RAP frame does not match the identifier of the RAP frame that immediately preceded it, then it indicates that a RAP frame was lost during transmission. In this case, the decoder may engage error recovery processes.

13 Claims, 5 Drawing Sheets

(56) References Cited

U.S. PATENT DOCUMENTS

| | | | |
|---|---|---|---|
| 2007/0073779 A1* | 3/2007 | Walker et al. | 707/104.1 |
| 2007/0088971 A1* | 4/2007 | Walker et al. | 714/4 |
| 2008/0170564 A1* | 7/2008 | Shi | H04N 21/23424 370/386 |
| 2009/0213938 A1 | 8/2009 | Lee et al. | |
| 2009/0213940 A1 | 8/2009 | Steinbach et al. | |
| 2010/0150230 A1 | 6/2010 | Zhou et al. | |
| 2011/0069756 A1* | 3/2011 | Matthews | H04N 21/6379 375/240.12 |
| 2012/0287999 A1* | 11/2012 | Li | H04N 19/52 375/240.16 |
| 2013/0089152 A1 | 4/2013 | Wang et al. | |
| 2013/0128948 A1 | 5/2013 | Rabii et al. | |
| 2013/0142257 A1 | 6/2013 | Wang et al. | |

OTHER PUBLICATIONS

Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, CH, Apr. 27-May 7, 2012.

Bross et al., "High Efficiency Video Coding (HEVC) Text Specification Draft 8,", Joint Collaborative Team on Video Coding (JCT-VC) of ITU-T SG16 WP3 and ISO/IEC JTC1/SC29/WG11, 10th Meeting: Stockholm, SE, Jul. 11-20, 2012.

Bross et al., "High Efficiency Video Coding (HEVC) Text Specification Draft 10 (for FDIS & Consent)," Joint Collaborative Team on Video Coding (JCT-VC) of ITU-T SG16 WP3 and ISO/IEC JTC1/SC29/WG11, 12th Meeting: Geneva, CH, Jan. 14-23, 2013.

Bross et al., "High Efficiency Video Coding (HEVC) Text Specification Draft 6," Joint Collaborative Team on Video Coding (JCT-VC) of ITU-T SG16 WP3 and ISO/IEC JTC1/SC29/WG11, 7th Meeting: Geneva, CH, Nov. 21-30, 2011.

Kim et al., "Channel Adaptive Error Resilience Scheme for Video Transmission Over Mobile WiMAX," IEICE Transactions on Communications, Communications Society, Tokyo, JP, vol. E91-B, No. 10, Oct. 1, 2008, pp. 3052-3059.

Fukunaga et al., "Error Resilient Video Coding by Dynamic Replacing of Reference Pictures," IEEE Globecom, vol. 3, Nov. 18, 1996, pp. 1503-1508.

Aissa et al., "Coding with Dynamic Rate Control for Low-Delay Image Transmission over CDMA Fading Channels," Vehicular Technology Conference, IEEE, vol. 2, May 18, 1998, pp. 1488-1492.

Duong et al., "Efficient Frame Error Concealment Using Bilateral Motion Estimation for Low-Bit Rate Video Transmission," IEICE Transactions on Communications, Communications Society, Tokyo, JP, vol. E92B, No. 2, Feb. 1, 2009, pp. 461-472.

Cote et al., "Using GFID in Error Prone Environments," ITU Study Group 16—Video Coding Experts Group, Feb. 16, 1999, p. 1.

Chen et al., "Distributed Video Coding with Adaptive Selection of Hash Functions"; Received Jun. 16, 2010; Revision accepted Nov. 19, 2010; Crosschecked Mar. 31, 2011; Journal of Zhejiang University-Science C (Computers & Electronics) ISSN 1869-1951 (Print); ISSN 1869-196X (Online).

Mulroy et al., "Windowed Reference Picture Selection for H.264 Transmission Error Recovery," Broadband Applications Research Centre, BT, Adastral Park, Ipswich, UK, Nov. 7, 2007, XP030080494, 4 pages.

Stephan Wenger et al., "Error Resilience Support in H.263+," Tampere, Finland, Video Coding Experts Group of ITU-T SG.16, Document No. Q15-D-17, Apr. 15, 1998, XP030002765, 21 pages.

Dr Stephan Wenger, "Video Redundancy Coding in H.263+," 2 VCEG Meeting, Sunriver, Oregon, Video Coding Experts Group of ITU-T SG.16, Document No. Q15-B-18, Sep. 3, 1997, XP030002657, 8 pages.

Rickard Sjoberg et al., "Absolute signaling of reference pictures," Joint Collaborative Team on Video Coding (JCT-VC) of ITU-T SG16 WP3 and ISO/IEC JTC1/SC29/WG11, 6th Meeting: Torino, Document No. JCTVC-F493, m20923, Jul. 22, 2011, XP030049486, 15 pages.

* cited by examiner

ERROR RESILIENT TRANSMISSION OF RANDOM ACCESS FRAMES AND GLOBAL CODING PARAMETERS

BACKGROUND

The present invention relates to video coding systems and, in particular, to techniques that maintain synchronization between encoder and decoders in such video coding systems in the presence of transmission errors.

In video coding systems, a video encoder may code a source video sequence into a coded representation that has a smaller bit rate than does the source video and, thereby, may achieve data compression. The encoder may code processed video data according to any of a variety of different coding techniques to achieve compression. One common technique for data compression uses predictive coding techniques (e.g., temporal/motion predictive coding). For example, some frames in a video stream may be coded independently of other frames (I-frames) and some other frames (e.g., P-frames or B-frames) may be coded using other frames as prediction references. P-frames may be coded with reference to a single previously-coded frame (called, a "reference frame") and B-frames may be coded with reference to a pair of previously-coded reference frames. The resulting compressed sequence (bit stream) may be transmitted to a decoder via a channel. To recover the video data, the bit stream may be decompressed at the decoder by inverting the coding processes performed by the coder, yielding a recovered video sequence.

A variety of coding protocols such as H.264 and the forthcoming HEVC (current under draft as ITU-T doc. JCTVC-J1003_d7), define processes that develop coding states during a video coding session. That is, as frames are coded in their respective I-, P- or B-frame coding modes, they may be coded using parameters that are selected with reference to a coding state that is defined by previously-coded frames. Thus, proper coding and decoding of a given frame may rely on the coding state that is established by other frames. When frames are lost, for example, due to transmission errors that arise between the encoder and the decoder, synchronization of state can be lost.

Modern coding protocols define classes of frames, called Random Access Pictures ("RAP frames" herein) that reset coder states to known values. Examples of RAPs are Instantaneous Decoding Refresh ("IDR") pictures in H.264/AVC, and IDR pictures, Broken Link Access ("BLA") pictures and Clean Random Access ("CRA") pictures in HEVC. Typically, each RAP frame defines boundaries between other coding structures supported by the protocol such as Groups of Pictures ("GOPs"). Upon receiving a RAP frame, a decoder clears its reference picture cache, resets internal states such as frame numbers, picture order counts, temporal motion vector prediction caches, etc., based on a specified schedule. If such RAP frames are lost during coding sessions, it can cause disastrous mismatches between the encoder's state and the decoder's state, as the encoder codes new frames based on an expectation that the decoder will have processed the RAP frame properly (e.g., cleared the reference picture cache and reset its states). When a RAP picture is lost and a decoder receives subsequent frames after the RAP, it can continue decoding these frames with the wrong states. In real-time video communication applications, therefore, the use of RAP pictures in the middle of the transmission usually is avoided.

RAPs can be valuable as they can be used to reset video coding sessions from any previous mismatch, or invalid states inside the decoder. Therefore, the inventors perceive that it would be useful to engage in coding protocols in which an encoder may transmit RAP pictures in the middle of a coding session, without suffering from serious consequences when RAPs are lost during transmission.

DETAILED DESCRIPTION

Embodiments of the present invention provide error mitigation techniques for video coding in which input frames are selected for coding either as a RAP frame or as a non-RAP frame. Coded RAP frames may include RAP identifiers that set an ID context for subsequent frames. Coded non-RAP frames may include RAP identifiers that match the RAP identifiers that were included in the coded RAP frames. Thus, in the absence of transmission errors, a coded non-RAP frame should include a RAP identifier that matches the identifier of the preceding RAP frame. If the identifier of a non-RAP frame does not match the identifier of the RAP frame that starts the current GOPs, then it indicates that a RAP frame was lost during transmission. In this case, the decoder may engage error recovery processes.

Figure 1:
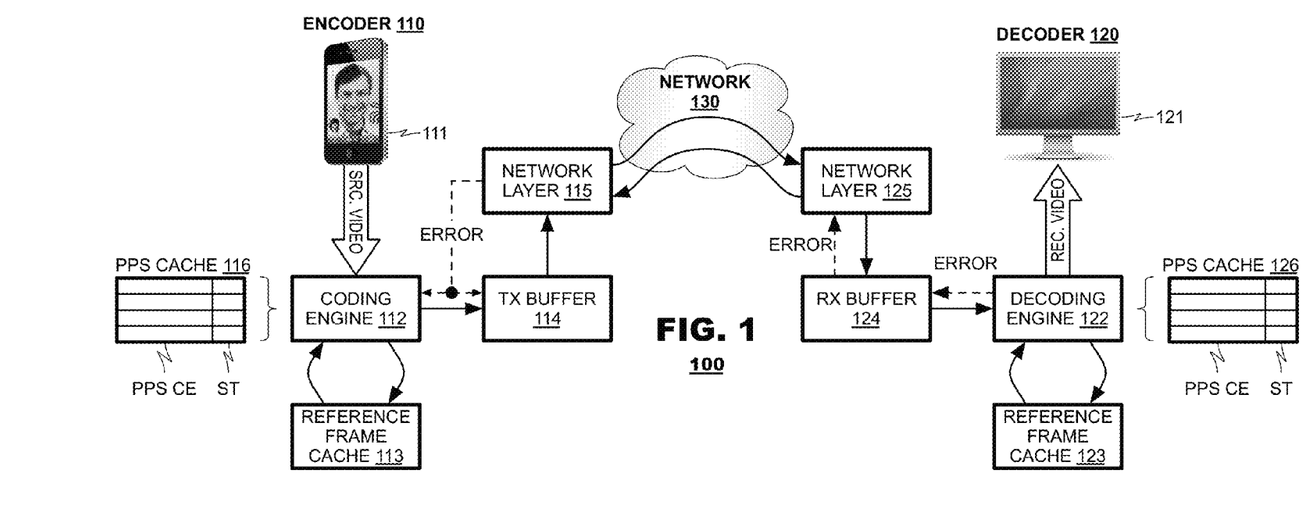
FIG. 1 is a simplified block diagram of an encoder/decoder system according to an embodiment of the present invention.

FIG. 1 is a simplified block diagram of an encoder/decoder system 100 according to an embodiment of the present invention. The system 100 may include an encoder 110 and a decoder 120 interconnected via a network 130. The encoder 110 may generate video data representing locally-captured image information and may code it for delivery over the network 130. The network 130 may deliver the coded video to a decoder 120. Some coding protocols involve lossy coding techniques, in which case, the decoder 120 may generate a recovered video sequence that represents an approximation of the source video. Other coding protocols may be lossless, in which case, the decoder 120 may generate a recovered video sequence that replicates the source video. In either case, the decoder 120 may output the recovered video sequence for local viewing.

In FIG. 1, the encoder 110 and decoder 120 may be provided within a variety of computing platforms, including servers, personal computers, laptop computers, tablet computers, smart phones, media players and/or dedicated video conferencing equipment. The network 130 represents any number of networks that convey coded video data among the encoder 110 and decoder 120, including for example wireline and/or wireless communication networks. A communication network may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present invention unless explained hereinbelow.

The encoder 110 may include a video source 111, a coding engine 112, a reference frame cache 113, a transmit buffer 114 and a network layer processor 115. The video source 111 may generate the video sequence for coding. Typical video sources 111 include cameras that generate video from locally-captured image information and storage devices or screen buffers (not shown) in which video may be stored, e.g., for media serving applications. The coding engine 112 may code frames of video data according to motion-compensated or intra-predictive coding. The reference frame cache 113 may store decoded video data obtained from coded frames marked as reference frames by the coding engine 112 for use in predictive coding of other frames. The coding engine 112 may generate the decoded video data using a process that is fully replicated at the decoding engine 122 yielding identical decoded video data in the event of no transmission or system (media transfer) errors. The coding engine 112, thus, may include functionality that is a superset of functionality within the decoding engine 122 since it may replicate decoding functions. The transmit buffer 114 may store coded video data as it is output by the coding engine 112 and awaiting transmission via the network 130. The network layer processor 115 may manage communication of video data to a decoder 120 over a network channel.

The decoder 120 may include a rendering unit 121, a decoding engine 122, a reference frame cache 123, a receive buffer 124 and a network layer processor 125. These components that invert operations of the encoder 110. The network layer processor 125 may manage reception of data received from the encoder 110 via the network 130. The receive buffer 124 may store the received data, may parse the data into component data streams and may forward coded video data to the decoding engine 122. The decoding engine 122 may invert coding processes applied by the coding engine 112 and generate decoded video therefrom. The decoding engine 122 may output the recovered video data to the rendering unit 121 for consumption. The rendering unit 121 may be a display, a storage device or scaler (not shown) to which recovered video data may be output. The decoding engine 122 may output the recovered video data of reference frames to the reference frame cache 123, which may store the decoded reference frames for use in later decoding operations.

During coding, the coding engine 112 may assign to each frame a certain frame type, which can affect the coding techniques that are applied to the respective frame. For example, frames often are assigned to as one of the following frame types:
  An Intra Frame ("I" frame) is one that is coded and decoded without using any other frame in the sequence as a source of prediction,
  A Predictive Frame ("P" frame) is one that is coded and decoded using earlier frames in the sequence as a source of prediction,
  A Bidirectionally Predictive Frame ("B" frame) is one that is coded and decoder using both earlier and future frames in the sequence as sources of prediction.
Frames commonly are parsed spatially into a plurality pixel blocks (for example, blocks of 4×4, 8×8 or 16×16 pixels each) and coded on a pixel block-by-pixel block basis. Pixel blocks may be coded predictively with reference to other coded pixel blocks as determined by the coding assignment applied to the pixel blocks' respective frame. For example, pixel blocks of I frames can be coded non-predictively or they may be coded predictively with reference to pixel blocks of the same frame (spatial prediction). Pixel blocks of P frames may be coded non-predictively, via spatial prediction or via temporal prediction with reference to one previously-coded reference frame. Pixel blocks of B frames may be coded non-predictively, via spatial prediction or via temporal prediction with reference to one or two previously-coded reference frames.

Coding operations may be performed with reference to coding state data (not shown) that is developed by the coding engine 112 during operation. Thus, coding of a first I frame may generate a coding context for a second frame, which might be coded as a P frame. Coding of the I and P frames may develop a coding context for a third frame, which might be coded as a B frame. The coded I and P frames may be decoded by the coding engine 112 and stored in the reference picture cache 113 to serve as prediction references for later-received frames. And, if some later received frame were coded as an I frame, the coding engine 112 may be operating at a different coding state than at which it was operating when coding a first I frame. The coding engine 112 may select different coding parameters for each I frame even though the coding modes for both frames are the same and even if the two frames have similar image content. As discussed below, RAP frames may reset such coding states.

During operation, frames of input video data may be coded by the coding engine 112 and output to the transmit buffer 114. The transmit buffer 114 may include a buffer (not shown) to store coded video data until it is to be transmitted and may include sub-systems to merge the coded video data with other data streams, such as audio data and/or metadata (also not shown), into a channel bit stream for transmission. The network layer processor 115 may retrieve channel bit stream data, format it for delivery over the network 130 and transmit the formatted data to the network 130.

The network layer processor 115 also may receive indicators from the network 130 and/or the decoder 120 (via the network 130) regarding transmission or bit stream transfer layer errors that may occur on the channel bit stream. The network layer processor 115 may provide error indications to the coding engine 112 and/or the transmit buffer 114. In response, the coding engine 112 may engage error recovery processes as described herein. The transmit buffer 114 also may respond to error notifications by purging its queues of coded data that await transmission, as described herein.

The network layer processor 125 of the decoder 120 may manage communication with the network 130. In the absence of transmission errors, the network layer processor 125 may receive the channel bit stream and forward the bit stream to a local receive buffer 124. When transmission errors occur, the network layer processor 125 may report error indicators to the encoder 110 via the network 130. The receive buffer 124 may store the received data in a queue (not shown), parse the data into component data streams such as coded video streams, coded audio streams, etc. The receive buffer 124 may forward the coded video data to the decoding engine 122. When the decoding engine 122 decodes reference frames that are marked as requiring acknowledgments to the encoder 110, the decoder 120 may create acknowledgment messages which are transmitted to the encoder 110 via the receive buffer 124 and network layer processor 125 (path not shown in FIG. 1).

Decoding operations may be performed with reference to coding state data (not shown) that is developed by the decoding engine 122 during operation. Thus, decoding of a first I frame may generate a decoding context for a second frame, which might be coded as a P frame and, therefore, decoded as a P frame. Decoding of the I and P frames may develop a decoding context for a third frame, which might be decoded as a B frame. The decoded I and P frames may be stored in the reference picture cache 123 to serve as prediction references for later-received frames. And, if some later received frame were decoded as an I frame, the decoding engine 122 may be operating at a different state than at which it was operating when decoding a first I frame. The decoding engine 122 may decode the two frames according to different decoding parameters even though the coding modes for both frames are the same. Again, as discussed below, RAP frames may reset such coding states.

Figure 2:
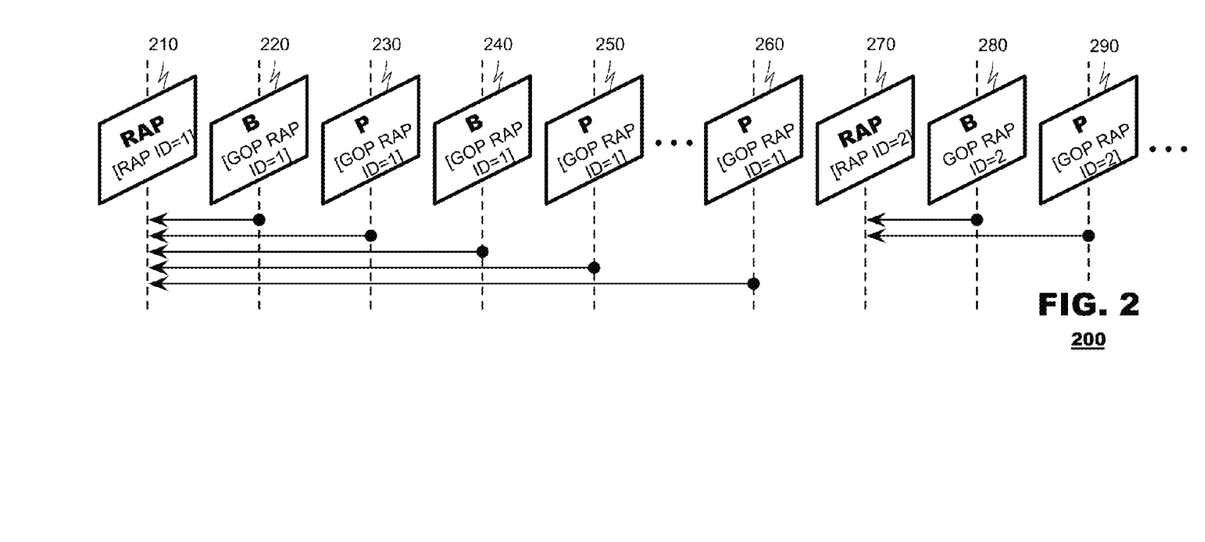
FIG. 2 illustrates an exemplary coding sequence according to an embodiment of the present invention.

FIG. 2 illustrates an exemplary coding sequence according to an embodiment of the present invention. According to the embodiment, input frames are assigned a coding mode and coded according to that mode. Input frames that are coded as a RAP frame may be assigned a RAP identifier. The RAP identifier may be included in a designated field of the coded video data representing the RAP frame and may be transmitted to a decoder. Input frames that are coded as other types of frames ("non-RAP frames" herein), may include field for a RAP frame identifier as well. The RAP ID field may identify the RAP frame that preceded it.

FIG. 2 illustrates a sequence of frames 210-290. Frames 210 and 270 are shown as RAP frames. They may include RAP identifiers, figuratively shown as "no. 1" and "no.2", respectively. Frames 220-260 and 280-290 are shown as non-RAP frames. Frames 220-260 each may include a RAP identifier that identifies RAP identifier no. 1. Frames 280-290 also may include RAP identifiers that identify the RAP frame that precedes them; in this case, frames 280-290 may include identifiers that represent RAP identifier no. 2.

During operation, coded frames may be lost in transmission between an encoder and a decoder. If frame 270 were lost during transmission but frames 280-290 were received successfully by a decoder, the RAP identifiers in frames 280 and 290 would not match the RAP identifier of the last RAP frame (frame 210) that was received properly at the decoder. Thus, the decoder can detect loss of the RAP frame 270.

Table 1 illustrates a syntax for RAP identifiers according to an embodiment of the present invention. In this example, the RAP identifiers are provided in a first slice header of each frame. The RAP identifiers are shown as applied to HEVC, which at the time of this writing is under draft at but, of course, they can be applied to other coding protocols.

TABLE 1

| slice_header( ) { | Descriptor |
|---|---|
|    first_slice_in_pic_flag | u(1) |
|    If( RapPicFlag ) | |
|       no_output_of_prior_pics_flag | u(1) |
|    pic_parameter_set_id | ue(v) |
|    if ( rap_id_enabled_flag ) { | |
|       if( RapPicFlag ) | |
|          rap_id | u(v) |
|       else | |
|          gop_rap_id | u(v) |
|    } | |
| } | |

In the example of Table 1, the first_slice_in_pic_flag field, the no_output_of_prior_pics_flag field and the pic_parameter_set_id field may be provided as set forth in HEVC. Generally speaking, the first_slice_in_pic_flag field may specify whether the slice is the first slice of the frame, the no_output_of_prior_pics_flag field may specify how previously-decoded pictures in a reference picture are treated after decoding of an IDR or a BLA frame and the pic_parameter_set_id may specify a picture parameter set in use for the slice.

Table 1 illustrates the HEVC syntax as augmented to include signaling of RAP identifiers. Specifically, the rap_id field may be used when the slice is being included within a RAP frame. The rap_id field may include an identifier code that sets the RAP identifier for subsequently received non-RAP frames. The gop_rap_id field may be used for non-RAP frames and may include the identifier code of the RAP frame that immediately preceded it. As shown in Table 1, the syntax establishes a RapPicFlag state for each frame, which distinguishes between RAP frames and non-RAP frames and causes one of the RAP identifier fields.

The rap_id_enabled_flag field and the length of rap_id and gop_rap_id can be defined in other entities within the channel bit stream. For example, in HEVC, they may be provided the sequence parameter set or picture parameter set.

FIG. 2 also illustrates application of these fields in an exemplary coding sequence. As indicated, frame 210 is shown as a RAP frame, which involves use of a rap_id field. In this example, the rap_id is set to 1. Frames 220-260 are shown as non-RAP frames and as such may carry gop_rap_id fields that designate the RAP frame (frame 210) that preceded them. Thus, frames 220-260 are shown as carrying gop_rap_id fields set to 1. Frame 270 is another RAP frame, which carries a new rap_id value of 2. Frames 280-290 are non-RAP frames, which carry gop_rap_id fields set to 2, designating the RAP frame (frame 270) that preceded them.

Figure 3:
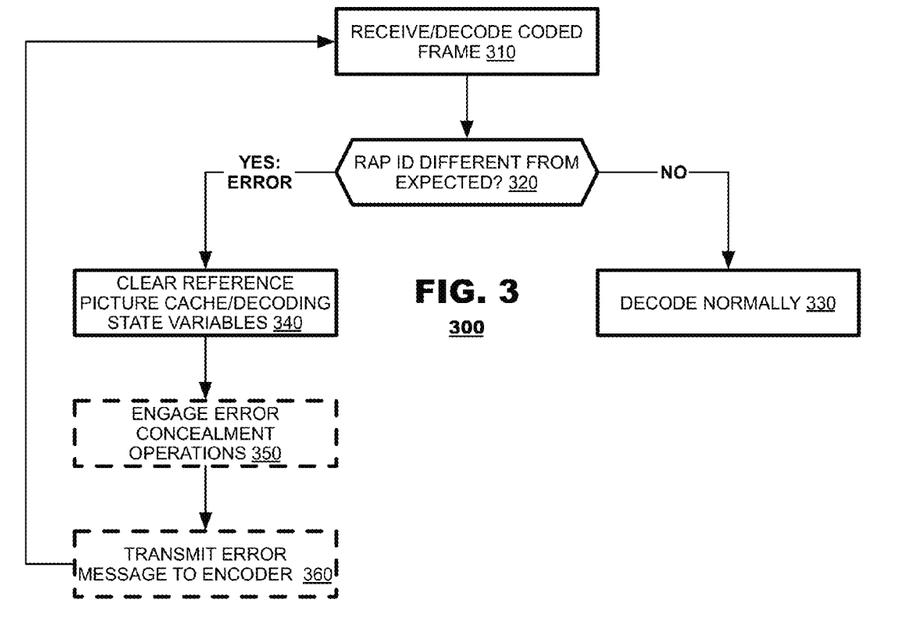
FIG. 3 illustrates a method of processing a non-RAP frame according to an embodiment of the present invention.

FIG. 3 illustrates a method 300 of processing a coded, non-RAP frame according to an embodiment of the present invention. The method 300 may begin on receipt of a coded frame of video data. The method 300 may receive the coded video data and begin work on decoding it (box 310). As part of the decoding process, the method 300 may extract the RAP identifier and determine whether it is different than an expected RAP identifier (box 320). If the RAP identifier matches an expected value, the method 300 may decode the coded frame in a normal decoding mode (box 330). If the RAP identifier differs from an expected value, then the method 300 may initiate an error recovery process. The RAP identifier mismatch may indicate to the decoder that it failed to receive a RAP frame that preceded the coded frame in the coded video sequence. In response, the method 300 may clear the reference picture cache and decoding stage variables (box 340); doing so is appropriate because the missing RAP frame, if received, would have caused the decoder to clear the reference picture cache and state variables. Thus, the decoder does not have appropriate decoding state data sufficient to decode the received frame. Optionally, the encoder may engage in error concealment operations (box 350), for example, to repeat display of coded video data until coding operations resume. In another embodiment, a RAP identifier mismatch may cause the method 300 to transmit an error message to an encoder (box 360). In the processing branch represented by boxes 340-360 the coded frame will not be decoded because the decoder does not have coding state information or prediction reference data necessary to decode the coded frame.

Figure 4:
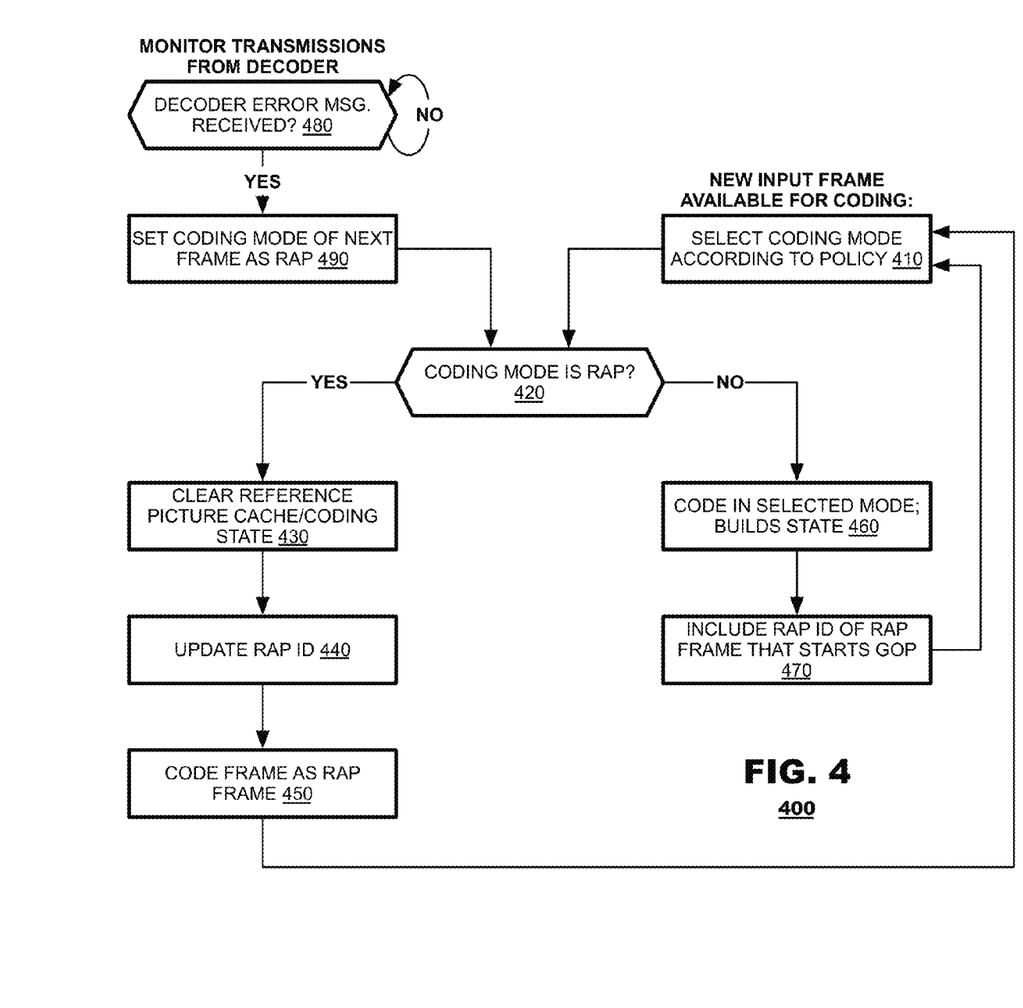
FIG. 4 illustrates a method of coding input frames according to an embodiment of the present invention.

FIG. 4 illustrates a method 400 of coding input frames according to an embodiment of the present invention. The method 400 may begin on receipt of a new frame that is available for coding. The method 400 may begin by assigning a coding mode to the new frame (box 410). When the frame is selected as a RAP frame (box 420), the method 400 may clear the reference picture cache and coding states (box 430). The method 400 may update the RAP identifier (box 440) and code the input frame according to a coding mode appropriate for such frames (box 450). When the frame is selected as a non-RAP frame (box 420), the method may code the input frame according to the selected mode (box 460). Coding the input frame as a non-RAP frame may contribute to updates of the reference picture cache and/or coding state. The method 400 may include the RAP identifier of the RAP frame in the coded video data that starts the current GOP (box 470). At the conclusion of operation of box 450 or box 470, the coded video data of the new frame may be transmitted to a decoder (not shown) and operation may advance to processing of another frame. Operation of boxes 410-470 may repeat until conclusion of a video coding session.

The application of box 470 may be performed differently for different types of RAP frames. For example, in HEVC for IDR frames, the RAP frame will be the RAP frame most recently received from the channel. For BLA and CRA frames, the RAP frame will be the RAP frame received from the channel that precedes the non-RAP frame in display order. In all three cases, the RAP frame defines the onset of a GOP to which the non-RAP frame belongs.

The method 400 may monitor transmissions from a decoder in a process that operates in parallel to the coding operations of boxes 410-470. As part of this process, the method 400 may determine whether an error message has been received from the decoder indicating a lost RAP frame (box 480). If so, the method 400 may engage in an error recovery process that may cause a next frame to be coded as a RAP frame (box 490). This may cause the encoder's reference picture cache and coding state to be reset (box 430) and a new input frame to be coded as a RAP frame with a new RAP identifier (boxes 440-450). Alternatively, the encoder may retransmit the last RAP frame.

Figure 5:
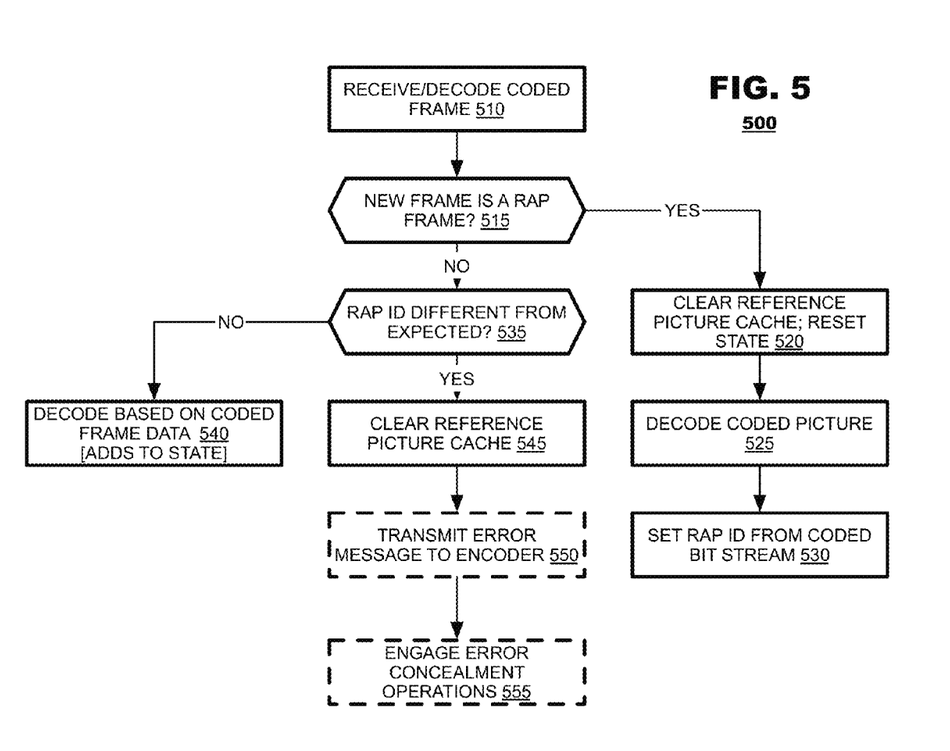
FIG. 5 illustrates a decoding method.

FIG. 5 illustrates a decoding method 500 according to an embodiment of the present invention. The method 500 may begin on receipt of a coded frame. The method 500 may code the coded frame (box 510) by parsing the coded bit stream into its constituent parts. As part of this process, the method 500 may interpret data representing a type of coding that has been applied to the frame. The method 500 may determine whether the frame is a RAP frame (box 515). If the new frame is a RAP frame, the method 500 may clear the reference picture cache and reset state variables present at the decoder (box 520). The method 500 may decode the coded picture (box 525) and may set a RAP identifier value based on value present in the coded frame data (box 530).

If at box 515, the frame was determined to be a non-RAP frame, the method 500 may compare the RAP identifier present in the coded frame data with a RAP identifier present at the decoder (box 535). If the RAP identifiers match, then the method 500 may decode the coded frame data (box 540).

If the RAP identifiers do not match, then a transmission error has occurred. The method 500 may clear the reference picture cache (box 545). In an embodiment, the method 500 may transmit an error message to an encoder identifying the transmission error (box 550). In a further embodiment, the method 500 may engage in error concealment techniques (box 555). In this regard, the method 500 may use the same techniques as discussed above with respect to FIG. 3.

Embodiments of the present invention provide a communication protocol to exchange a Picture Parameter Set ("PPS") between an encoder and a decoder. A PPS contains a number of global coding parameters that may be used by an encoder and decoder to process frame data. Coded frame data may include a PPS identifier, provided in a slice header (shown above), that indicates which PPS the current slice is using. PPS information typically is transmitted at the onset of a video coding session. It may be advantageous to permit an encoder to transmit a new PPS (or modify an existing PPS) in the middle of a coding session, to adapt to content changes or changing network conditions. In the presence of transmission errors, it can be dangerous to transmit a PPS in the middle of a coding session because, if the PPS is lost, a serious mismatch can arise between the encoder's and the decoder's coding states.

Figure 6:
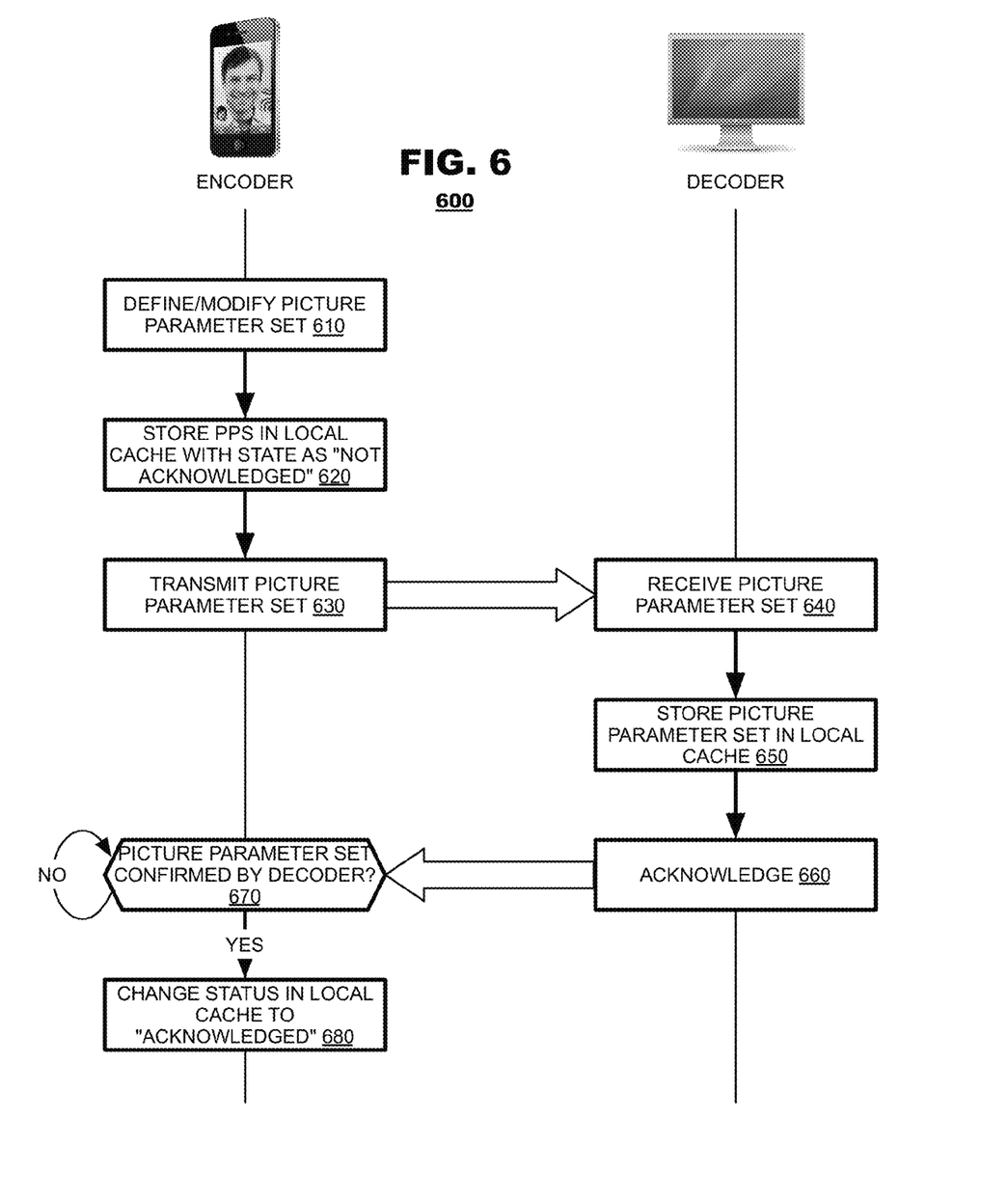
FIG. 6 illustrates a transmission method.

FIG. 6 illustrates a transmission method 600 to reliably exchange PPS information in the midst of a video coding session. In order to avoid this problem, we propose the following scheme. During operation, an encoder may define or modify a PPS (box 610). The encoder may store the new PPS locally (for example, in a PPS cache 116 (FIG. 1)) at the encoder and mark the PPS with a state identifier to indicate that the PPS has not yet been acknowledged by a decoder (box 620). Thereafter, the encoder may transmit the PPS to a decoder (box 630).

The PPS data may be received at a decoder in the absence of transmission errors (box 640). Upon receipt of the PPS data, the decoder may store the PPS data locally, for example, in a PPS cache 126 (FIG. 1) (box 650). The decoder also may transmit an acknowledgment message to the encoder to indicate that the PPS data has been received and stored successfully at the decoder (box 660).

At the encoder, the encoder will scan for the acknowledgment message from the decoder (box 670). If the acknowledgment message is received, the encoder may change the status of the stored PPS data to a state indicating that the PPS data has been acknowledged by the decoder (box 680). At this point, the encoder may code input data using the new PPS. Thus, the encoder and decoder may keep track of the generated and received PPS, and only the acknowledged ones will be used.

With such a scheme, an encoder and decoder can place a variety of useful coding parameters to PPS so that they can be changed in the middle of coding sessions. Examples are:

- num_explicit_pic_order_cnt_msb_cycle_bits, as described in applicants' co-pending application Ser. No. 13/626,730, filed Sep. 25, 2012 and incorporated herein by reference, which allows an encoder to define a number of bits for picture order count signaling on the fly;
- explicit_pic_order_cnt_msb_cycle_enabled_flag also as described in applicants' co-pending application Ser. No. 13/626,730;
- log 2_max_pic_order_cnt_lsb_minus4, which as defined in HEVC specifies the value of the variable MaxPicOrderCntLsb that is used in the decoding process for picture order count.
- long_term_ref_pics_present_flag, currently specified as belonging to a sequence parameter set in HEVC;
- num_long_term_ref_pics_sps, currently specified as belonging to a sequence parameter set in HEVC;
- lt_ref_pic_poc_lsb_sps[i], currently specified as belonging to a sequence parameter set in HEVC;
- used_by_curr_pic_lt_sps_flag[i], currently specified as belonging to a sequence parameter set in HEVC.

During coding, an encoder may switch among different acknowledged sets of PPS data as it codes input frames. Taking the num_explicit_pic_order_cnt_msb_cycle_bits field as an example, which defines a number of bits to be used for coding picture order count, an encoder may utilize a PPS set that assigns a relatively low number of bits (say, four bits) to represent picture order count when the encoder determines that the channel has a low incidence of transmission errors but may switch to another PPS set that assigns a higher number of bits (say, eight bits) to represent picture order count when a higher rate of transmission errors is observed. By relying on acknowledged sets of PPS data, the encoder avoids other types of synchronization loss that might be encountered when transmission errors are prevalent.

The foregoing discussion has described operation of the embodiments of the present invention in the context of coding servers, distribution servers and client devices. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers or computer servers. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronics devices, such as gaming systems, DVD players, portable media players and the like and they also can be packaged in consumer software applications such as video games, browser-based media players and the like. And, of course, these components may be provided as hybrid systems that distribute functionality across dedicated hardware components and programmed general purpose processors as desired.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. An error mitigation method for video coding, comprising:
   on receipt of a coded Random Access Picture (RAP frame), retrieving an identifier from the coded RAP frame and storing it locally,
   on receipt of a coded non-RAP frame,
   retrieving an identifier from the coded non-RAP frame,
   comparing the identifier retrieved from the coded non-RAP frame to the identifier retrieved from a most-recently received RAP frame, and
   if the identifiers do not match, indicating a loss of a previously-coded RAP frame.

2. The method of claim 1, further comprising, when the identifiers do not match, disqualifying the coded non-RAP frame from decoding.

3. The method of claim 1, further comprising, when the identifiers do not match, transmitting an error message to an encoder.

4. The method of claim 1, further comprising, when the identifiers do not match, performing error concealment operations at a display.

5. The method of claim 1, further comprising, when the identifiers do not match, clearing a reference picture cache at a decoder.

6. The method of claim 1, further comprising, when the identifiers do not match, resetting coding state values at a decoder.

7. The method of claim 1, further comprising, when the identifiers match, decoding the coded non-RAP frame data at a decoder.

8. A coding method, comprising:
   assigning coding modes to input frames,
   coding the input frames according to their assigned coding mode, wherein
   when an input frame is selected for coding as a Random Access Picture (RAP frame), the coding comprises clearing previously established coding state values at an encoder and including a RAP identifier in the RAP frame;
   when the input frame is selected for coding as a non-RAP frame, the coding comprises coding the input frame with reference to the previously-established coding state values and including an identifier of a most-recently coded RAP frame in the non-RAP frame,
   when an error message is received indicating loss of a previously-coded RAP frame, coding a next input frame as a RAP frame, wherein the loss of the previously-coded RAP frame is detectable based on a mismatch between an identifier of a previously-coded non-RAP frame and an identifier of a previously-coded RAP frame that is most recent with respect to the previously-coded non-RAP frame.

9. The method of claim 8, wherein when the input frame is selected for coding as a RAP frame, the coding comprises clearing a reference picture cache at the encoder.

10. The method of claim 8, wherein when the input frame is selected for coding as a non-RAP frame, the coding comprises coding the input frame predictively with reference to data stored in a reference picture cache at the encoder.

11. A method of signaling Picture Parameter Set ("PPS") data, comprising, at an encoder:
    defining the PPS data,
    storing the PPS data locally with a state identifier that indicates the PPS is not yet acknowledged by a decoder,
    transmitting the PPS data to a decoder, and
    when an acknowledgment message is received from a decoder indicating that the decoder has successfully stored the PPS data, revising the state identifier to indicate that the PPS data is acknowledged,
    coding input video data according to motion compensated prediction techniques, including selecting one of a plurality of sets of acknowledged PPS data and using the selected set of PPS data during the coding, wherein PPS data whose state identifiers fail to indicate acknowledgement are excluded from being selected.

12. The method of claim 11, wherein the selected set of PPS data is selected based on a rate of observed transmission errors.

13. The method of claim 12, further comprising:
    selecting PPS data that assigns a higher number of bits to represent a picture order count when transmission errors are prevalent, and
    selecting PPS data that assigns a lower number of bits to represent the picture order count when there are fewer observed transmission errors.

* * * * *